(12) United States Patent
Shirai et al.

(10) Patent No.: US 6,329,049 B1
(45) Date of Patent: Dec. 11, 2001

(54) PRESSURE-SENSITIVE ADHESIVE AND SURFACE PROTECTING MATERIAL

(75) Inventors: Mitsuyoshi Shirai; Isamu Teranishi; Hideki Mitsuda; Akira Taguchi; Kenji Sano, all of Osaka; Komaharu Matsui, Kanagawa; Takeshi Eda; Hiroshi Ueda, both of Hyogo, all of (JP)

(73) Assignees: Nitto Denko Corporation, Osaka; Kansai Paint Co., Ltd., Hyogo, both of (JP)

( * ) Notice: Subject to any disclaimer, the term of this patent is extended or adjusted under 35 U.S.C. 154(b) by 0 days.

(21) Appl. No.: 09/280,676

(22) Filed: Mar. 29, 1999

(30) Foreign Application Priority Data

Mar. 31, 1998 (JP) .................................................. 10-105476

(51) Int. Cl.⁷ ............................. C08L 23/22; C08K 5/09; C08K 5/05
(52) U.S. Cl. ................................... 428/352; 428/355 AC; 428/356; 428/355 BL; 525/333.8
(58) Field of Search .................................. 428/352, 356, 428/355 BL, 355 AC; 525/333.8

(56) References Cited

U.S. PATENT DOCUMENTS

| 2,463,452 | | 3/1949 | Yule . | |
|---|---|---|---|---|
| 3,503,911 | * | 3/1970 | Goldenberg et al. | 260/23 |
| 5,262,489 | * | 11/1993 | White et al. | 525/333.6 |
| 5,434,221 | | 7/1995 | White et al. . | |
| 5,601,917 | | 2/1997 | Matsui et al. | 428/356 |
| 5,612,135 | | 3/1997 | Matsui et al. | 428/343 |
| 5,747,132 | | 5/1998 | Matsui et al. | 428/41.7 |
| 5,810,960 | | 9/1998 | Matsui et al. | 156/305 |

FOREIGN PATENT DOCUMENTS

| 1 594 176 | 8/1969 | (DE) . |
|---|---|---|
| 1 569 269 | 1/1971 | (DE) . |
| 0 670 357 A1 | 9/1995 | (EP) . |
| 0 839 886 A2 | 5/1998 | (EP) . |

OTHER PUBLICATIONS

Patent Abstracts of Japan, vol. 006, No. 214 (1982), Publication No. 57117534 (Jul. 22, 1982).
European Search Report.

* cited by examiner

*Primary Examiner*—Daniel Zirker
(74) *Attorney, Agent, or Firm*—Sughrue, Mion, Zinn, Macpeak & Seas, PLLC

(57) ABSTRACT

A pressure-sensitive adhesive comprising 100 parts by weight of an isobutylene polymer having been masticated in an organic solvent with a radical generator and 0.001 to 5 parts by weight of at least one release control agent selected from the group consisting of an alcohol having a molecular weight of 90 to 300 and an oxygen atom content of 8.5% or more or a derivative thereof and a carboxylic acid having a molecular weight of 70 to 400 and an oxygen atom content of 11% or more or a derivative thereof; and a surface protecting material having a pressure-sensitive adhesive layer comprising the adhesive. The adhesive has well-balanced characteristics in initial adhesion, retention of initial adhesion, and weather resistance.

6 Claims, No Drawings

PRESSURE-SENSITIVE ADHESIVE AND SURFACE PROTECTING MATERIAL

FIELD OF THE INVENTION

This invention relates to a pressure-sensitive adhesive and a surface protecting material which exhibit good initial adhesion, retention of the initial adhesion, and excellent weather resistance and can easily be removed after long-term adhesion.

BACKGROUND OF THE INVENTION

A surface protecting material comprising a substrate and a pressure-sensitive adhesive layer comprising an isobutylene polymer as a base polymer is known. Compared with acrylic or natural rubber-based pressure-sensitive adhesive layers, polyisobutylene-based pressure-sensitive adhesive layer hardly increases its adhesiveness with time even when exposed to sunlight so that it is easily removed from an adherend surface without leaving the adhesive, which is advantageous for use as a surface protecting material. On the other hand, the initial adhesive strength of the polyisobutylene-based pressure-sensitive layer is sacrificed to adhesion retention and weather resistance. Therefore, it has been difficult to secure adhesion retention and weather resistance in good balance with initial adhesion.

SUMMARY OF THE INVENTION

An object of the present invention is to provide a polyisobutylene-based pressure-sensitive adhesive and a surface protecting material comprising the same which exhibit satisfactory initial adhesion, retention of the initial adhesion, and weather resistance in good balance and is easily removable without leaving the adhesive on the adherend surface even after long-term adhesion.

The present invention provides a pressure-sensitive adhesive comprising 100 parts by weight of an isobutylene polymer having been masticated in an organic solvent with a radical generator and 0.001 to 5 parts by weight of at least one release control agent selected from the group consisting of an alcohol having a molecular weight of 90 to 300 and an oxygen atom content of 8.5% or more or a derivative thereof and a carboxylic acid having a molecular weight of 70 to 400 and an oxygen atom content of 11% or more or a derivative thereof.

The present invention also provides a surface protecting material comprising a substrate having thereon a pressure-sensitive adhesive layer comprising the above-described pressure-sensitive adhesive.

The release control agent used in the invention exhibits high polarity due to the existence of oxygen atoms having high electronegativity. When the highly polar release control agent is formulated into a pressure-sensitive adhesive layer comprising an isobutylene polymer having its molecular weight reduced by mastication with a radical generator in an organic solvent, it is localized in the vicinities of the adhesive layer interface based on its high polarity in a peculiar compatible state to form a layer having weak cohesion in the vicinities of the adhesive interface. By the action of this layer, there are provided a pressure-sensitive adhesive having well-balanced adhesion characteristics including initial adhesion, weather resistance, and retention of the initial adhesion and a removable surface protecting material which exhibits satisfactory adhesion, retains the initial adhesion for a long time and is easily removed without leaving the adhesive.

DETAILED DESCRIPTION OF THE INVENTION

The pressure-sensitive adhesive according to the invention essentially comprises 100 parts by weight of an isobutylene polymer having been masticated with a radical generator in an organic solvent and 0.001 to 5 parts by weight of a release control agent selected from the group consisting of an alcohol having a molecular weight of 90 to 300 and an oxygen atom content of 8.5% or more or a derivative thereof and a carboxylic acid having a molecular weight of 70 to 400 and an oxygen atom content of 11% or more or a derivative thereof. The surface protecting material according to the invention comprises a substrate having thereon a pressure-sensitive adhesive layer comprising the pressure-sensitive adhesive of the invention.

The isobutylene polymer which can be used in preparation of the pressure-sensitive adhesive has been masticated in an organic solvent with a radical generator. The isobutylene polymer to be masticated includes an isobutylene homopolymer and an isobutylene-isoprene random copolymer (i.e., butyl rubber) or a vulcanized or modified product thereof, such as regular butyl rubber, halogenated (e.g., chlorinated or brominated) butyl rubber, and partially crosslinked butyl rubber.

The modified butyl rubber also includes one prepared by introducing a functional group, such as a hydroxyl group, a carboxyl group, an amino group or an epoxy group, into the random copolymer. Isobutylene polymers preferred for weather resistance, etc. include an isobutylene homopolymer, an isobutylene-isoprene random copolymer having an isoprene content of 0.5 to 3% by weight and its vulcanized or modified product. An isobutylene homopolymer is particularly preferred. These isobutylene polymers can be used either individually or as a combination of two or more thereof.

From the viewpoint of the balance among initial adhesion, retention of initial adhesion, and weather resistance, it is preferred for the isobutylene polymer be masticated to such a degree that the weight average molecular weight is reduced to 90% or less, desirably 10 to 80%. More specifically, a preferred degree of mastication is such that the masticated isobutylene polymer may have a weight average molecular weight of 300,000 to 700,000 and/or a number average molecular weight of 100,000 to 400,000.

Accordingly, the average molecular weight of the isobutylene polymer to be masticated is decided appropriately based on the desired molecular weight after mastication. Polymers having a weight average molecular weight of 2,500,000 or smaller, particularly 330,000 to 2,000,000, especially 350,000 to 1,500,000 are generally used for their solubility in an organic solvent. The number average molecular weight of the polymer to be masticated is arbitrarily selected. The above-described isobutylene polymers can be used either individually or as a mixture of two or more thereof having different average molecular weights. The change in molecular weight of an isobutylene polymer by mastication can easily be seen through measurement by gel-permeation chromatography, etc.

The mastication of the isobutylene polymer is carried out with a radical generator in an organic solvent. Mastication of an isobutylene polymer having no isoprene unit (e.g., polyisobutylene) could be performed by a mastication operation applied to isoprene unit-containing rubber, such as natural rubber and butyl rubber, that is carried out by adding an organic peroxide as a peptizer to solid rubber followed by mastication in a pressure kneader, a roll mill or a Banbury mixer. It turned out, however, that an isobutylene polymer having been masticated by the mastication operation fails to achieve a satisfactory balance among weather resistance, adhesion retention and initial adhesion probably because of difference in molecular weight distribution.

The organic solvent which can be used for mastication of the isobutylene polymer is appropriately selected from those capable of dissolving the isobutylene polymer.

Examples of generally useful organic solvents include aliphatic hydrocarbons having 5 to 15 carbon atoms, such as n-hexane, isohexane, n-heptane, isoheptane, n-octane, isooctane, cyclohexane, methylcyclohexane, methylhexane, dimethylpentane, nonane, and decane; aromatic hydrocarbons having 6 to 12 carbon atoms, such as toluene, xylene, ethylbenzene, isopropylbenzene, diethylbenzene, triethylbenzene, and diisopropylbenzene; mixed hydrocarbons, such as gasoline, petroleum ether, petroleum benzine, ligroin, mineral spirit, and kerosine; alcohols; ketones; and ethers. These organic solvents can be used either individually or as a mixture of two or more thereof. Preferred organic solvents are those comprising 80% by weight or more of aliphatic hydrocarbons preferably having 6 to 8 carbon atoms.

The radical generator which can be used for mastication includes radical polymerization initiators, such as organic peroxides and azo compounds; and other organic or inorganic compounds, organometallic compounds and metal complexes capable of generating a radical.

Examples of useful organic peroxides include ketone peroxides, such as methyl ethyl ketone peroxide and acetylacetone peroxide; peroxy ketals, such as 1,1-bis(t-hexylperoxy) cyclohexane and 2,2-bis(t-butylperoxy) butane; hydroperoxides, such as diisopropylbenzene hydroperoxide and cumene hydroperoxide; dialkyl peroxides, such as α, α'-bis(t-butylperoxy)diisopropylbenzene and dicumyl peroxide; diacyl peroxides, such as 2,4-dichlorobenzoyl peroxide, 3,5,5-trimethylhexanoyl peroxide, octanoyl peroxide, lauroyl peroxide, stearoyl peroxide, succinic acid peroxide, m-toluoylbenzoyl peroxide, benzoyl peroxide, dipropionyl peroxide, and diacetyl peroxide; peroxydicarbonates, such as di(3-methyl-3-methoxybutyl) peroxydicarbonate, di-2-methoxybutyl peroxydicarbonate, diisopropyl peroxydicarbonate, di-n-propyl peroxydicarbonate, and di(2-ethoxyethyl) peroxydicarbonate; and peroxy esters, such as t-butyl peroxyisobutyrate, 1,1,3,3-tetramethylbutyl peroxy-2-hexanoate, t-butyl peroxyneodecanoate, and t-butyl peroxypivalate.

Examples of useful azo compounds are 2,2'-azobisisobutyronitrile, 2,2'-dichloro-2,2'-azobispropane, 1,1'-azo(methylethyl) diacetate, 2,2'-azoisobutane, 2,2'-azobis(methyl 2-methylpropionate), 2,2'-azobis(2-methylbutyronitrile), 4,4'-azobis(4-cyanovaleric acid), 4,4'-azobis(dimethyl 4-cyanovalerate), 3,5-dihydroxymethylphenylazo-2-methylmalonodinitrile, 2,2'-azobis(2-methylvaleronitrile), 2,2'-azobis(2,4-dimethylvaleronitrile), 2,2'-azobis(2,4-dimethyl-4-methoxyvaleronitrile), 2,2'-azobis(2-hydroxyemthylpropionitrile), 1,1'-azobis(cyclohexanenitrile), 1,1'-azobis(cyclohexane-1-carbonitrile), 2,2'-azobis(2-propylbutyronitrile), 1,1'-azobis(l-chlorophenylethane), 1,1'-azobis(1-phenylethane), 1,1'-azobiscumene, ethyl 4-nitrophenylazobenzylcycanoacetate, phenylazodiphenylmethane, phenylazotriphenylmethane, 4-nitrophenylazotriphenylmethane, 1,1'-azobis(1,2-diphenylethane), poly(tetraethylene glycol-2,2'-azobisisobutyrate), dimethyl 2,2'-azobis(2-methylpropionate), and 2,2'-azobis[2-(2-imidazolin-2-yl) propane].

Additional examples of useful radical generators include organic compounds, such as 1,4-bis(pentamethylene)-2-tetrazene, 1,4-dimethoxycarbonyl-1,4-diphenyl-2-tetrazene, and benzenesulfonyl azide.

Radical generators preferred for molecular weight control are those which are reduced one-half in 10 hours at 60° C. or higher, particularly 70° C. or higher, in benzene, such as diacyl peroxides, e.g., octanoyl peroxide, lauroyl peroxide, stearoyl peroxide, succinic acid peroxide, m-toluoylbenzoyl peroxide, and benzoyl peroxide. Benzoyl peroxide is especially preferred.

Compared with the solid phase reaction occurring in mastication of solid rubber, the mastication with a radical generator in an organic solvent, which is a liquid phase reaction, is advantageous in that the operations involved, such as addition of a peptizer, are easier; the energy required for the treatment is lower, molecular weight reduction proceeds more mildly, making average molecular weight control easier; and the liquid after the treatment can be used as such in the preparation of the pressure-sensitive adhesive.

The mastication can be carried out by, for example, stirring the polymer solution in the organic solvent at a temperature at which the radical generator decomposes in the similar manner to radical polymerization. The isobutylene polymer concentration in the solution, which can appropriately be decided according to the solution viscosity, etc., usually ranges from 5 to 70% by weight, preferably 10 to 50% by weight, still preferably 15 to 40% by weight.

The amount of the radical generator to be used is subject to variation according to the speed of mastication treatment, etc., usually ranging from 0.01 to 20 parts by weight, preferably 0.05 to 10 parts by weight, still preferably 0.1 to 5 parts by weight, per 100 parts by weight of the isobutylene polymer. The average molecular weight of the resulting masticated isobutylene polymer can be controlled by the kind and amount of the radical generator and the time and temperature of the mastication treatment.

Having influences on the adhesion characteristics, heat resistance, weather resistance, and the like, the average molecular weight of the masticated isobutylene polymer is appropriately selected according to the desired characteristics. The atmosphere in the mastication vessel is appropriately selected from an inert gas (e.g., nitrogen), air, etc. An agent for controlling the decomposition rate of the radical generator may be added to the mastication system. For example, addition of various reducing agents or amine compounds, such as N,N-dimethylaniline, triethylamine and tributylamine, is effective for accelerating the decomposition.

The release control agent which is added to the pressure-sensitive adhesive of the invention to develop the above-mentioned peculiar compatible state comprises one or more of an alcohol having a molecular weight of 90 to 300 and an oxygen atom content of 8.5% or more or a derivative thereof and a carboxylic acid having a molecular weight of 70 to 400 and an oxygen atom content of 11% or more or a derivative thereof. The release control agent having high polarity, which is assigned to the high electronegativity of oxygen, exhibits compatibility to the isobutylene base polymer and is localized, when formulated as a pressure-sensitive adhesive layer, in the adhesive interface in a peculiar compatible state.

From the viewpoint of compatibility (which assures that the release control agent be retained in the adhesive layer without bleeding and exhibit satisfactory properties in forming the above-mentioned peculiar compatible state), improved adhesion, and long-term retention of the adhesion characteristics, a preferred release control agent is selected from an alcohol having a molecular weight of 100 or more, particularly 110 or more, especially 120 or more, a derivative of such an alcohol, a carboxylic acid having a molecular weight of 80 or more, particularly 90 or more, especially 100 or more, and a derivative of such a carboxylic acid.

An alcohol whose molecular weight is smaller than 90 or a derivative thereof or a carboxylic acid whose molecular weight is smaller than 70 or a derivative thereof would be lost through vaporization, etc., and the amount of the release control agent localized in the vicinities of the adhesive interface would be insufficient. It follows that the adhesion retention properties are reduced to impair removability. Where an alcohol or a derivative thereof whose molecular weight exceeds 300 or a carboxylic acid or a derivative thereof whose molecular weight exceeds 400 is used as a release control agent, the layer formed of the agent localized in the vicinities of the interface would have too high a cohesive force, which ruins the removability.

If the oxygen atom content of the alcohol or alcohol derivative is less than 8.5%, or if that of the carboxylic acid or carboxylic acid derivative is less than 11%, the polarity is insufficient for making a clear difference from the polarity of the isobutylene polymer. As a result, a peculiar compatible state of the release control agent is hardly manifested in the vicinities of the adhesive interface, failing to accomplish the object of the invention. The oxygen atom content as referred to herein is calculated from equation:

$$\text{Oxygen atom content }(\%)=(16A/Mw)\times 100$$

wherein A is the number of oxygen atoms present per molecule of the alcohol or alcohol derivative or the carboxylic acid or carboxylic acid derivative; and Mw is the molecular weight of the alcohol or a derivative thereof or the carboxylic acid or a derivative thereof.

The alcohol having a molecular weight of 90 to 300 and an oxygen atom content of 8.5% or more includes 1,1-cyclohexanediol, 3,3,5-trimethyl-1,1-cyclohexanediol, 2-methyl-2-pentanol, 2-(4-isopropylphenyl)-2-propanol, 2-hexyl-2-propanol, and 2-phenyl-2-propanol. The alcohol derivative includes esters formed of the above-enumerated alcohol component.

The carboxylic acid having a molecular weight of 70 to 400 and an oxygen atom content of 11% or more includes isobutyric acid, caprylic acid, succinic acid, benzoic acid, toluylic acid, and isophthalic acid. Benzoic acid is particularly preferred for the ease in compounding. The carboxylic acid derivative includes salts and esters of the above-enumerated carboxylic acids, such as triethylammonium benzoate.

As stated above, the alcohol or a derivative thereof or the carboxylic acid or a derivative thereof can be used either individually or as a combination of two or more selected therefrom. The alcohol and/or a derivative thereof and the carboxylic acid and/or a derivative thereof can be used in combination. The release control agent is used in an amount of 0.001 to 5 parts by weight per 100 parts by weight of the masticated isobutylene polymer.

If the amount of the release control agent is less than 0.001 part, the effect expected of compounding is insufficient to secure satisfactory adhesion retention and releasability. If it exceeds 5 parts, the initial adhesion is insufficient for adhesion to an adherend.

From the standpoint of the balance among weather resistance, adhesion retention, and initial adhesion, a preferred amount of the release control agent is 4.5 parts by weight or smaller, particularly 4 parts by weight or smaller, especially 0.002 to 2 parts by weight, per 100 parts by weight of the isobutylene polymer. Thus, the release control agent tends to manifest its effects advantageously when added in a relatively small amount.

The pressure-sensitive adhesive of the invention is prepared by mixing the components in an appropriate manner, for example, by mixing the masticateded isobutylene polymer as a base polymer and the release control agent in an appropriate solvent, such as toluene, hexane, cyclohexane or heptane. Where it is necessary to adjust the average molecular weight to control the adhesion characteristics, etc., non-masticated isobutylene polymer may be used in combination with the masticated isobutylene polymer. In this case, an isobutylene homopolymer is preferably used for the improvement in weather resistance.

If desired, the pressure-sensitive adhesive may contain various acceptable additives, such as pigments, fillers, antioxidants, and ultraviolet absorbers as long as the above-described effects in developing the peculiar compatible state and manifesting satisfactory adhesion characteristics are secured.

The surface protecting material according to the invention comprises a substrate having formed thereon a pressure-sensitive adhesive layer comprising the above-described pressure-sensitive adhesive. The surface protecting material is prepared by any known method commonly employed for formation of an adhesive sheet, for example, by coating a substrate with a solution of the pressure-sensitive adhesive or a molten pressure-sensitive adhesive or by once forming an adhesive layer on a release separator in the same manner as described above and then transferring the adhesive layer onto a substrate.

The substrate which can be used in the invention is not particularly limited, and any substrate known in the art can be employed. For example, a plastic film of polyolefins, e.g., propylene polymers, ethylene polymers or mixtures thereof, polyvinyl chloride polymers or polyesters; an air-permeable porous film, paper, and nonwoven fabric are employable. In particular, polyolefin films are preferred.

If desired, the surface of the substrate on which the adhesive layer is to be provided can be subjected to an appropriate surface treatment, such as a corona treatment or primer coating, to improve the adhesion, etc. of the adhesive layer to the substrate. Further, the substrate may contain a slip agent, an antistatic agent, an antioxidant, and the like, if desired.

While not limiting, the substrate usually has a thickness of 5 to 300 $\mu$m, preferably 200 $\mu$m or smaller, still preferably 10 to 100 $\mu$m, and the pressure-sensitive adhesive layer usually has a thickness of 200 $\mu$m or smaller, preferably 100 $\mu$m or smaller, still preferably 1 to 50 $\mu$m.

If necessary, the exposed surface of the adhesive layer may be protected with a separator, etc. until use, or the surface protecting material may be rolled up without a separator. The substrate of the separator and of the surface protecting material to be rolled up is surface treated with an appropriate release agent, such as a silicone, fluorine or long-chain acrylic release agent. Where the surface protecting material is rolled up, the back side of the substrate, with which the adhesive layer is brought into contact, is surface treated with the release agent.

The pressure-sensitive adhesive and the surface-protecting material of the invention are preferably applied to a variety of adherends, such as coated plates, metallic plates, resin plates, decorative laminates, and automobile bodies and parts. They are particularly useful in applications demanding excellent adhesion, resistance to change in adhesion with time, removability without leaving the adhesive, and weather resistance. The weather resistance specifically means resistance to deterioration by exposure to sunlight, for example, reduction in adhesion characteristics even in outdoor weathering during transportation or laying operation so that the adhesive layer may be removed without contaminating the adherend with any remaining adhesive.

The invention will now be illustrated in greater detail with reference to Examples, but it should be understood that the invention is not limited thereto. Unless otherwise noted, all the parts are by weight.

EXAMPLE 1

A hundred parts of polyisobutylene having a weight average molecular weight (Mw) of 800,000 (on polystyrene calibration in gel-permeation chromatography; hereinafter the same) and 400 parts of n-heptane were put in a reaction vessel and dissolved by stirring at an inner temperature of 85° C. While keeping the solution at that temperature, 1.8 parts of an equal weight mixture of benzoyl peroxide and dioctyl phthalate (Niper BO, produced by Nippon Oil and Fats Co., Ltd.) was added thereto, followed by stirring in an air atmosphere under atmospheric pressure for 15 hours to carry out mastication to obtain a polymer solution containing masticated polyisobutylene having an Mw of 500,000 and a number average molecular weight (Mn) of 300,000. Two parts of 2-phenyl-2-propanol (molecular weight: 136; oxygen atom content: 11.8%) were added to the polymer solution to prepare a pressure-sensitive adhesive. The adhesive was applied to a 40 µm thick film of polypropylene/polyethylene (⅛ by weight) and dried at 80° C. for 3 minutes to prepare a surface protecting material with a 10 µm thick pressure-sensitive adhesive layer.

The gel-permeation chromatography for molecular weight measurement was carried out on 4 columns (TSK gel G2000H HR, G3000H HR, G4000H HR, and GMH-H HR; manufactured by Toso Corp.) connected in series under the following conditions.

Eluent: tetrahydrofuran
Flow rate: 1 ml/min
Temp.: 400° C.
Sample concentration: 0.1 wt % in tetrahydrofuran
Sample pour: 500 µl
Detection: differential refractometer

EXAMPLE 2

A surface protecting material was prepared in the same manner as in Example 1, except that the pressure-sensitive adhesive was prepared by using 0.002 part of benzoic acid (molecular weight: 122; oxygen atom content: 26.2%) in place of the 2-phenyl-2-propanol.

EXAMPLE 3

Sixty parts of polyisobutylene having an Mw of 800,000, 40 parts of polyisobutylene having an Mw of 650,000, 300 parts of n-heptane, and 200 parts of n-octane were put in a reaction vessel and dissolved at an inner temperature of 80° C. with stirring. While keeping the solution at that temperature, 4.0 parts of a mixture of 40 wt % of m-toluoylbenzoyl peroxide and 60 wt % of toluene (Niper BMT-T40, produced by Nippon Oil and Fats Co., Ltd.) was added thereto, followed by stirring in an air atmosphere under atmospheric pressure for 15 hours to carry out mastication to obtain a polymer solution containing masticated polyisobutylene having an Mw of 380,000 and an Mn of 230,000. One part of 1,1-cyclohexanediol (molecular weight: 116; oxygen atom content: 27.6%) was added to the polymer solution to prepare a pressure-sensitive adhesive. A surface protecting material was prepared using the resulting adhesive in the same manner as in Example 1.

EXAMPLE 4

A surface protecting material was prepared in the same manner as in Example 3, except that the pressure-sensitive adhesive was prepared by using 0.01 part of succinic acid (molecular weight: 118; oxygen atom content: 54.2%) in place of the 1,1-cyclohexanediol.

Comparative Example 1

A surface protecting material was prepared in the same manner as in Example 1, except for using a pressure-sensitive adhesive containing no 2-phenyl-2-propanol.

Comparative Example 2

A surface protecting material was prepared in the same manner as in Example 1, except for changing the amount of the 2-phenyl-2-propanol to 10 parts.

Comparative Example 3

A surface protecting material was prepared in the same manner as in Example 3, except that 1,1-cyclohexanediol was not added.

Evaluation

1) Adhesive Strength (initial and after accelerated weathering)

Each of the surface protecting materials obtained in Examples and Comparative Examples was adhered to a plate coated with an alkyd melamine resin paint (Amilac LIS No. 300 Black, produced by Kansai Paint Co., Ltd.) by means of a laminator at 23° C. and 65% RH under a pressure of 70 N/cm at a speed of 5 m/min. After 30 minutes, the 180° peel strength (pulling speed: 300 mm/min) was measured to obtain the initial adhesive strength. Separately, the protective material stuck on the coated plate was subjected to accelerated weathering in Sunshine Carbon Weatherometer (manufactured by Suga Shikenki K.K.) for 200 hours in accordance with JIS D0205. After the weathering test, the sample was allowed to stand at 23° C. and 65% RH for 3 hours and then subjected to the same peel test to obtain the adhesive strength after accelerated weathering.

2) Weather Resistance

Test samples prepared in the same manner as in (1) above were fixed to an outdoor mount. After 180 days' exposure to natural weathering conditions, the surface protecting material was stripped off the coated plate to check any contamination of the coated plate. Samples which caused little contamination with a residual adhesive, etc. were judged good, and those caused perceptible contamination with a residual adhesive, etc. were judged no good.

3) Overall Judgement

Samples which had an adhesive strength, both initial and after accelerated weathering, in the range of from 2.2 to 6.5 N/20 mm in the peel test (1) and caused no contamination of the coated plate by adhesive remaining, etc. in the 180 days' outdoor weathering test (2) were judged "pass", and those which failed to satisfy either one or both of these requirements were judged "failure".

The results of the evaluation are shown in Table 1 below.

TABLE 1

| | Adhesive Strength (N/20 mm) | | Weather Resistance | Overall Judgement |
|---|---|---|---|---|
| | Initial | After Accelerated Weathering | | |
| Example 1 | 2.2 | 3.7 | good | pass |
| Example 2 | 4.3 | 6.5 | good | pass |
| Example 3 | 2.7 | 4.3 | good | pass |
| Example 4 | 3.5 | 5.6 | good | pass |
| Compara. Example 1 | 4.3 | 10.0 | no good | failure |
| Compara. Example 2 | 0.3 | 0.5 | good | failure |
| Compara. Example 3 | 4.2 | 10.5 | no good | failure |

It is seen from Table 1 that all the samples of Examples have satisfactory initial adhesion, are prevented from increasing the adhesive strength with time, and exhibit excellent weather resistance, whereas the samples of Comparative Examples 1 and 3 show a considerable increase in adhesive strength with time and have poor weather resistance, and the sample of Comparative Example 2 has a low initial adhesive strength. As is understood from comparison between Examples and Comparative Examples, a pressure-sensitive adhesive layer having well-balanced adhesion characteristics in initial adhesion, retention of the initial adhesion, and weather resistance can be obtained by compounding a masticated isobutylene base polymer with a small amount of a release control agent showing high polarity due to oxygen atoms having large electronegativity.

While the invention has been described in detail and with reference to specific examples thereof, it will be apparent to one skilled in the art that various changes and modifications can be made therein without departing from the spirit and scope thereof.

What is claimed is:

1. A pressure-sensitive adhesive comprising 100 parts by weight of an isobutylene polymer having been masticated in an organic solvent with a radical generator and 0.001 to 5 parts by weight of at least one release control agent selected from the group consisting of an alcohol having a molecular weight of 90 to 300 and an oxygen atom content of 8.5% or more or a derivative thereof and a carboxylic acid having a molecular weight of 70 to 400 and an oxygen atom content of 11% or more or a derivative thereof, wherein said masticated isobutylene polymer has a weight average molecular weight of 90% or smaller of that of the isobutylene polymer before mastication.

2. A pressure-sensitive adhesive comprising 100 parts by weight of an isobutylene polymer having been masticated in an organic solvent with a radical generator and 0.001 to 5 parts by weight of at least one release control agent selected from the group consisting of an alcohol having a molecular weight of 90 to 300 and an oxygen atom content of 8.5% or more or a derivative thereof and a carboxylic acid having a molecular weight of 70 to 400 and an oxygen atom content of 11% or more or a derivative thereof, wherein said masticated isobutylene polymer has a weight average molecular weight of 100,000 to 400,000.

3. The pressure-sensitive adhesive as claimed in claim 1 or claim 2 wherein said carboxylic acid is benzoic acid.

4. The pressure-sensitive adhesive as claimed in claim 1 or claim 2, wherein said radical generator has a half-life of 10 hours at 60° C. or higher in benzene.

5. The pressure-sensitive adhesive as claimed in claim 4, wherein said radical generator is benzoyl peroxide.

6. A surface protecting material comprising a substrate having thereon a pressure-sensitive adhesive layer comprising a pressure-sensitive adhesive as defined in claim 1 or claim 2.

* * * * *